United States Patent
Rodatz et al.

(10) Patent No.: US 10,132,218 B2
(45) Date of Patent: Nov. 20, 2018

(54) EXHAUST SYSTEM FOR A MOTOR VEHICLE

(71) Applicant: Continental Automotive GmbH, Hannover (DE)

(72) Inventors: Paul Rodatz, Landshut (DE); Michael Nienhoff, Regensburg (DE); Tino Arlt, Regensburg (DE); Thomas Schoen, Parsberg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/304,754

(22) PCT Filed: Apr. 16, 2014

(86) PCT No.: PCT/EP2014/057724
§ 371 (c)(1),
(2) Date: Oct. 17, 2016

(87) PCT Pub. No.: WO2015/158376
PCT Pub. Date: Oct. 22, 2015

(65) Prior Publication Data
US 2017/0037753 A1   Feb. 9, 2017

(51) Int. Cl.
*F01N 3/00* (2006.01)
*F01N 3/021* (2006.01)
*F01N 11/00* (2006.01)

(52) U.S. Cl.
CPC .............. *F01N 3/021* (2013.01); *F01N 11/00* (2013.01); *F01N 11/007* (2013.01);
(Continued)

(58) Field of Classification Search
USPC .......... 60/274, 276, 277, 286, 295, 297, 311
See application file for complete search history.

(56) References Cited

U.S. PATENT DOCUMENTS 7,500,358 B2 * 3/2009 Singh .................... F01N 3/0842
60/276
8,136,351 B2 * 3/2012 Paterson ................. F01N 3/023
60/285
(Continued)

FOREIGN PATENT DOCUMENTS

DE   112011104812 T5   10/2013   .............. F01N 3/02
EP      2031370 A1      3/2009   .............. F01N 11/00
(Continued)

OTHER PUBLICATIONS

German Office Action, Application No. 102013206391.1, 5 pages, dated Nov. 13, 2013.
(Continued)

*Primary Examiner* — Binh Q Tran
(74) *Attorney, Agent, or Firm* — Slayden Grubert Beard PLLC

(57) ABSTRACT

The present disclosure relates to engines for a motor vehicle and some embodiments include a method for operating an exhaust train of a motor vehicle engine including: measuring a particle concentration downstream of a particle filter at a first operating point; determining the filter efficiency at the first operating point; changing operation of the engine to a second operating point to increase the particle emissions; measuring the particle concentration downstream of the filter at the second operating point; determining the filter efficiency at the second operating point; determining a difference between the efficiency levels; detecting an offset error, if the difference exceeds a defined threshold; and identifying a particle sensor as defective if an offset error is detected, rather than identifying the particle filter as defective.

10 Claims, 1 Drawing Sheet

(52) U.S. Cl.
CPC ...... *F01N 2550/04* (2013.01); *F01N 2560/05* (2013.01); *F01N 2900/1402* (2013.01); *Y02T 10/20* (2013.01); *Y02T 10/47* (2013.01)

(56) References Cited

U.S. PATENT DOCUMENTS

| | | | | |
|---|---|---|---|---|
| 8,656,763 B2* | 2/2014 | Yoshioka | ............... | F01N 3/023 73/114.31 |
| 8,695,331 B2* | 4/2014 | Handler | ............... | F01N 9/002 60/274 |
| 8,839,610 B2 | 9/2014 | Aoki | ............... | 60/295 |
| 2007/0125075 A1* | 6/2007 | Zanini-Fisher | ............ | F01N 11/00 60/297 |
| 2012/0159930 A1* | 6/2012 | Snopko | ............... | F01N 9/002 60/274 |
| 2013/0086888 A1 | 4/2013 | Lee et al. | ............... | 60/274 |

FOREIGN PATENT DOCUMENTS

| | | | | |
|---|---|---|---|---|
| EP | 2407774 A1 | 1/2012 | ............ | G01N 15/06 |
| EP | 2546484 A1 | 1/2013 | ............ | F01N 3/02 |
| JP | 2005325812 A | 11/2005 | ............ | B01D 46/42 |
| JP | 2007315275 A | 12/2007 | ............ | F01N 3/02 |
| JP | 2011179467 A | 9/2011 | ............ | F01N 3/00 |
| JP | 2012013058 A | 1/2012 | ............ | F01N 3/023 |
| JP | 2013019389 A | 1/2013 | ............ | F01N 3/023 |
| KR | 20130037553 A | 4/2013 | ............ | F01N 11/00 |
| WO | 2015/158376 A1 | 10/2015 | ............ | F01N 11/00 |

OTHER PUBLICATIONS

International Search Report and Written Opinion, Application No. PCT/EP2014/057724, 16 pages, dated Jun. 18, 2014.
Korean Notice of Allowance, Application No. 2018031316548, 3 pages, dated May 8, 2018.

* cited by examiner

EXHAUST SYSTEM FOR A MOTOR VEHICLE

CROSS-REFERENCE TO RELATED APPLICATIONS

This application is a U.S. National Stage Application of International Application No. PCT/EP2014/057724 filed Apr. 16, 2014, the contents of which is hereby incorporated by reference in their entirety.

TECHNICAL FIELD

The present disclosure relates to engines for a motor vehicle and some embodiments include a method for operating an exhaust train of a motor vehicle engine.

BACKGROUND

Particles are produced during the combustion of fuel in an internal combustion engine. Since these particles are damaging to the health, legislators have defined limiting values for these emissions. In order to be able to comply with these particle limiting values, particle filters are used, in particular, in the exhaust train of modern diesel engines in motor vehicles.

These particle filters are typically embodied as wall-flow filters based on ceramic materials. Legislators have also required that the functionality of the filter is monitored, specifically with the aid of what is referred to as "on-board diagnosis". In order to satisfy these requirements for monitoring, a sensor monitors the filter functionality of the wall-flow filter. This particle sensor is arranged downstream of the particle filter and measures the concentration of particles in the exhaust gas. If the particle filter is intact, a low particle concentration is measured. If the filter is damaged, an abnormally high concentration is determined.

In such a method for checking the functionality of a particle filter, correct measurement by the particle sensor is critical, since otherwise incorrect results lead to an incorrect particle filter diagnosis. The problems center on reliably detecting whether the sensor is measuring correctly.

SUMMARY

The teachings of the present disclosure may be embodied in a method for checking the functionality of a particle filter arranged in the exhaust train of a motor vehicle engine. The method may include: measuring the particle concentration ($c\_1$) in the exhaust gas downstream of the particle filter at a first operating point; determining the filter efficiency level ($eff\_1$) from the measured particle concentration ($c\_1$) and the modeled particle concentration upstream of the particle filter; changing over the operating point of the engine to a second operating point with the result that the particle emissions upstream of the particle filter rise strongly; measuring the particle concentration ($c\_2$) in the exhaust gas downstream of the particle filter at the second operating point; determining the filter efficiency level ($eff\_2$) at the second operating point analogously to the procedure at the first operating point; determining the absolute difference between the filter efficiency levels ($eff\_1$ and $eff\_2$); and detecting an offset error, if the absolute difference between the filter efficiency levels ($eff\_1$ and $eff\_2$) exceeds a defined threshold.

In some embodiments, the first operating point is one with low particle emissions.

In some embodiments, a stabilization phase is provided before the measurement of the particle concentration at the first and second operating points.

In some embodiments, depending on the sign of the difference between the filter efficiency levels ($eff\_1$, $eff\_2$) it is determined whether a positive or negative offset is present.

In some embodiments, it is used to determine the offset of a particle sensor used to measure the particle concentration.

In some embodiments, it is carried out in order to check the functionality of a soot filter.

DETAILED DESCRIPTION

Figure 1:
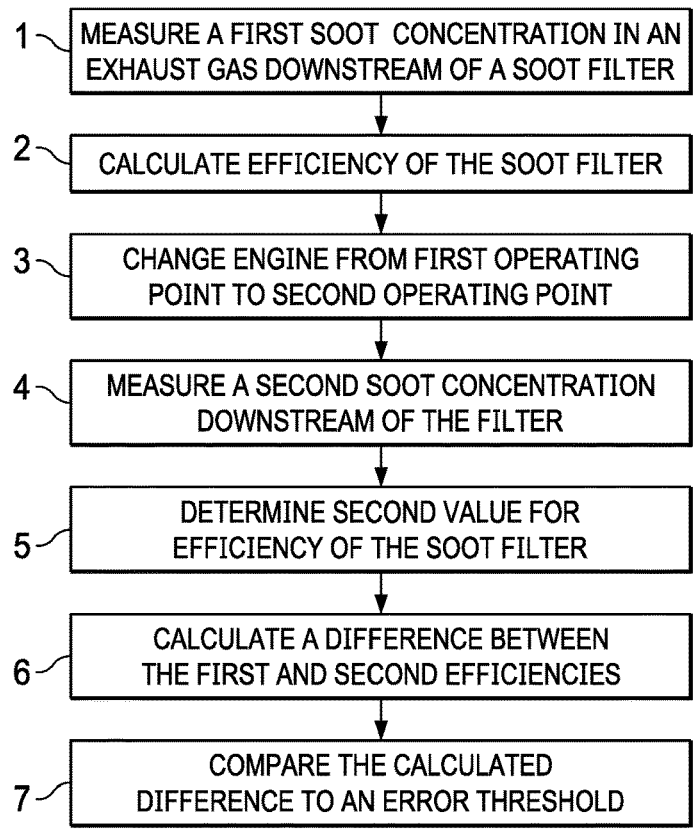
FIG. 1 is a schematic flow chart illustrating a method for checking the functionality of a particle filter.

In such particle sensors (soot sensors) which operate according to the resistive principle, a voltage is supplied between two electrodes. If such a soot sensor is in a soot-containing environment, soot accumulates between the electrodes. Since soot is composed essentially of C atoms, and carbon is an electrical conductor, a current can flow between the electrodes. In the normal operating mode, soot accumulates continuously on the surface of the sensor element. This leads to a situation in which the current also continuously rises. If the current exceeds a threshold, there is a changeover into a regeneration mode. In this context, the sensor is heated strongly by means of an electric heater, with the result that the accumulated soot burns off and the current drops back to a relatively low level. After this, the soot collecting process begins anew.

The strength of the current between the electrodes is dependent on the particle loading. In the case of no loading or low loading, the current is close to zero and increases as the loading rises. In order to be able to make a statement about the particle mass flow which flows past the sensor, the change in the current signal must be evaluated. A correlation of the particle mass flow is found on the basis of the rate of change of the current signal. The evaluation of the change in the current permits the particle mass flow to be evaluated in a limited time period.

A typical intact particle filter has a filter efficiency level of over 99%. The formation of a fracture in the ceramic can allow part of the gas flow to pass through the particle filter unhindered, with the result that the filter efficiency level drops. In this context, the filter efficiency level is independent of the particle concentration upstream of the particle filter.

A particle filter is considered to be faulty as soon as the average particle emissions at the output of the exhaust system exceed a defined threshold (OBD limiting value) of a defined driving profile (e.g., NEDC). A faulty particle filter must be reliably detected in the field. For this purpose, the filter efficiency level is determined on the basis of a modeled particle concentration (soot concentration) upstream of the filter, and on the basis of the measured particle concentration downstream of the filter (by means of the particle sensor). The filter efficiency level determined in this way may then compared with the filter efficiency level of the exhaust system at which the OBD limiting value is just exceeded in the defined driving profile. If the measured efficiency level is lower, a defective filter is present.

In this method, an offset tolerance in the measured particle concentration (soot concentration) can falsify the result of the determination of the filter efficiency level. An offset in the positive direction leads to a situation in which the filter efficiency level is determined as being too low and an intact filter is categorized as defective. Conversely, a negative offset can lead to a situation in which a defective filter is not detected as such. Hitherto, no methods have been known for detecting a systematic offset error of a particle sensor (soot sensor).

The teachings of the present disclosure may enable a method which supplies particularly precise results in terms of the checking of the functionality of a particle filter. In particular, this is intended to detect a systematic offset error (a continuous deviation) of a particle filter or of a particle sensor used for such a method. The method may include: measuring the particle concentration in the exhaust gas downstream of the particle filter at a first operating point; determining the filter efficiency level from the measured particle concentration and the modeled particle concentration upstream of the particle filter; changing over the operating point of the engine to a second operating point with the result that the particle emissions upstream of the particle filter rise strongly; measuring the particle concentration in the exhaust gas downstream of the particle filter at the second operating point; determining the filter efficiency level at the second operating point analogously to the procedure at the first operating point; determining the absolute difference between the filter efficiency levels; and detecting an offset error if the absolute difference between the filter efficiency levels exceeds a defined threshold.

As mentioned above, the real filter efficiency level is independent of the particle concentration upstream of the particle filter. This means that the filter efficiency level determined from the measured concentration is identical in a tolerance-free system in the case of low and high concentrations upstream. Given this, teachings of the present disclosure may employ concentration offset detection. The effects of the offset are naturally greatest in the case of small concentrations and decrease as the concentration increases. In the case of a very high concentration, an offset deviation is virtually negligible. This means that the determined filter efficiency level approaches the true value asymptotically. Therefore, an efficiency level which is variable over the concentration indicates an offset error.

In some embodiments, the changes in the filter efficiency level during a pronounced change in the raw emissions are evaluated. In this way, it is possible to detect an offset error in the measurement of the concentration. As a result, incorrect diagnoses in the monitoring or checking of the particle filters can be reduced or ruled out.

In some embodiments, two criteria are used for the detection of an offset error, specifically the magnitude of the absolute difference between the determined filter efficiency levels and the difference between the measured particle concentrations. If the absolute difference between the filter efficiency levels exceeds a defined threshold, an offset error is assumed because here an efficiency level is present which is variable over the concentration. The first operating point may be one with low particle emissions.

In some embodiments, a stabilization phase is expediently provided before the measurement of the particle concentrations. If an offset error is derived from the difference between the filter efficiency levels (exceeding a threshold), it is possible to determine whether a positive or negative offset is present depending on the sign of the difference between the filter efficiency levels.

In some embodiments, a method may be employed to determine the offset of a particle sensor used to measure the particle concentration.

The method is carried out, in particular, in order to check the functionality of a soot filter. The method may be part of on-board diagnosis of a soot filter arranged in the exhaust train of a diesel engine. A soot sensor for measuring the soot concentration in the exhaust gas is located downstream of the soot filter.

In order to check the functionality of the soot filter, in a first step (step 1) the soot concentration $c\_1$ in the exhaust gas downstream of the soot filter is measured at a first operating point. In a second step (step 2), the efficiency level $eff\_1$ of the soot filter is determined on the basis of the measured soot concentration and a modeled soot concentration (soot emission model) upstream of the soot filter.

In step 3, the operating point of the engine is changed over, with the result that the soot emissions upstream of the soot filter rise strongly. In this context, there is a changeover to a second operating point. The particle concentration $c\_2$ in the exhaust gas downstream of the soot filter is now in turn measured, specifically at the selected second operating point (step 4). The filter efficiency level $eff\_2$ at the second operating point is determined analogously to the procedure at the first operating point, with the result that two filter efficiency levels $eff\_1$ and $eff\_2$ are now available (step 5).

The absolute difference is now determined between the two filter efficiency levels (step 6). If the absolute difference between the filter efficiency levels exceeds a defined threshold, an offset error is detected (step 7). Fault diagnoses in the soot filter monitoring or checking can then be reduced or ruled out by taking into account this determined offset error.

Figure 2:
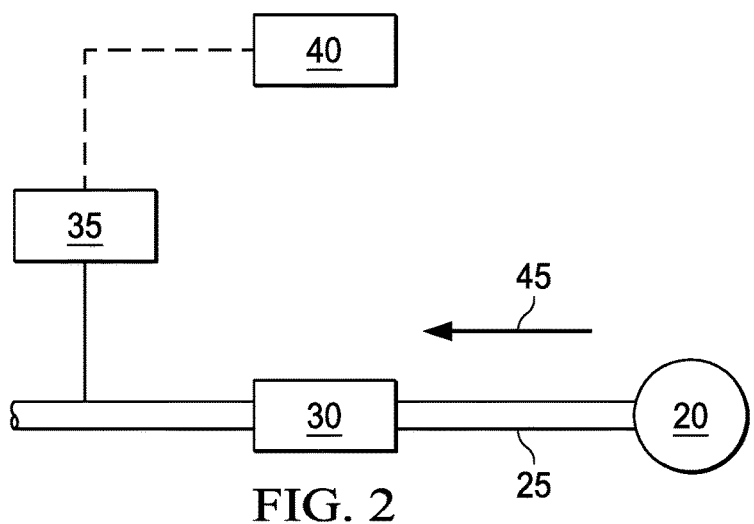
FIG. 2 is a schematic drawing illustrating a system for performing the method of FIG. 1.

FIG. 2 is a schematic drawing illustrating a system for performing the method of FIG. 1. A combustion chamber 20 feeds exhaust gas into an exhaust tract 25 in the direction of arrow 45. The exhaust gas passes through a filter 30. Downstream of the filter 30, a soot sensor 35 measures the soot content of the exhaust gas. The soot sensor 35 transmits a signal representing this measurement to an electronic control unit 40. The electronic control unit 40 is programmed to execute control of the various elements of the method described in relation to FIG. 1.

The invention claimed is:

1. A method for operating an exhaust train of a motor vehicle engine, the method comprising:
measuring a particle concentration with a soot sensor disposed in an exhaust gas downstream of a particle filter at a first operating point;
using an electronic control unit (ECU) programmed to determine a first filter efficiency level at the first operating point based at least in part on the measured particle concentration and a modeled particle concentration upstream of the particle filter based on the first operating point;
using the ECU programmed to change operation of the engine to a second operating point at which the particle emissions upstream of the particle filter rise strongly;
measuring the particle concentration with the soot sensor in the exhaust gas downstream of the particle filter at the second operating point;
using the ECU programmed to determine a second filter efficiency level at the second operating point based at least in part on the measured particle concentration and a modeled particle concentration upstream of the particle filter based on the second operating point;

using the ECU programmed to determine an absolute difference between the first and second filter efficiency levels;

using the ECU programmed to detect an offset error, if the absolute difference between the filter efficiency levels exceeds a defined threshold; and using the ECU programmed to identify a particle sensor as defective if an offset error is detected, rather than identifying the particle filter as defective.

2. The method as claimed in claim 1, wherein the first operating point is one with low particle emissions.

3. The method as claimed in claim 1, further comprising using the ECU programmed to stabilize the operation of the motor during a stabilization phase before measuring the particle concentration at each of the first and second operating points.

4. The method as claimed in claim 1, further comprising using the ECU programmed to determine whether a positive or negative offset is present depending on the sign of the difference between the filter efficiency levels.

5. The method as claimed in claim 1, further comprising using the ECU programmed to determine the offset of the particle sensor used to measure the particle concentration.

6. An exhaust system for an engine of a motor vehicle, the system comprising:

an exhaust train delivering an exhaust gas from the engine;

a particle filter arranged in the exhaust train;

a sensor measuring a particle concentration in the exhaust gas downstream of the particle filter; and a controller operable to:

determine a filter efficiency level at a first operating point of the engine based on a measured particle concentration and a modeled particle concentration upstream of the particle filter at the first operating point;

change the operating point of the engine to a second operating point at which the particle emissions upstream of the particle filter rise strongly;

determine a second filter efficiency level at the second operating point based on a second measured particle concentration and a modeled particle concentration upstream of the particle filter at the second operating point;

determine an absolute difference between the filter efficiency levels and identifies an offset error, if the absolute difference between the filter efficiency levels exceeds a defined threshold; and identify a particle sensor as defective if an offset error is detected, rather than identifying the particle filter as defective.

7. The exhaust system as claimed in claim 6, wherein the first operating point is one with low particle emissions.

8. The exhaust system as claimed in claim 6, wherein the controller provides a stabilization phase before measuring the particle concentration at each of the first and second operating points.

9. The exhaust system as claimed in claim 6, further comprising determining whether a positive or negative offset is present depending on the sign of the difference between the filter efficiency levels.

10. The exhaust system as claimed in claim 6, wherein the controller determines the offset of a particle sensor used to measure the particle concentration.

* * * * *